May 4, 1948.                    E. E. WILMER                    2,441,052
         COUPLING THAT COMPENSATES FOR AXIAL DISPLACEMENT
                        OF SHAFTS CONNECTED THEREBY
                           Filed Jan. 21, 1946
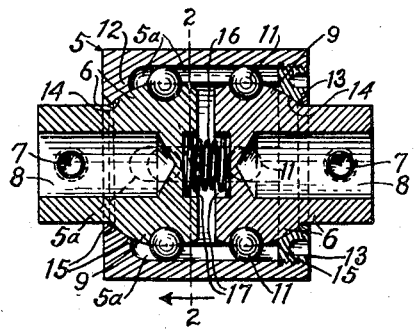
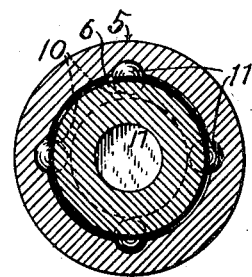
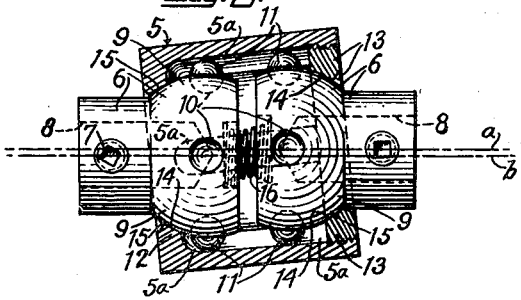
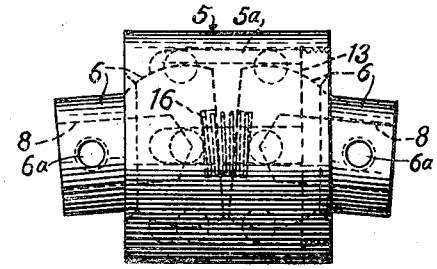
Inventor.
E. E. Wilmer.

Patented May 4, 1948

2,441,052

UNITED STATES PATENT OFFICE 2,441,052

COUPLING THAT COMPENSATES FOR AXIAL DISPLACEMENT OF SHAFTS CONNECTED THEREBY

Elmer E. Wilmer, Baltimore, Md.

Application January 21, 1946, Serial No. 642,506

6 Claims. (Cl. 64—8)

This invention relates to flexible shaft couplings, especially to a coupling that compensates for axial displacement of shafts connected thereby.

One object of this invention is to provide a very simple, compact and thoroughly practical self-adjusting or compensating shaft-coupling that consists of only a few simple elements that are capable of being manufactured by either forging or casting and machining, or by die-casting, or by any appropriate method of forming them from plastic material or composition.

Another object is to provide an exceedingly short-coupled shaft-coupling that occupies the minimum of space between the shaft-ends that are secured thereto; thereby not only saving material in the shaft-coupling per se, but also saving material in the common base for the two machines of which the shafts are, respectively, driving and driven thru this shaft-coupling; for instance, where a motor is coupled to a speed-changer.

Another object is to provide a combination of coupling elements that are capable of being very quickly and easily assembled by any adult of ordinary ability with slight training and experience, inasmuch as each of the shaft-connecting elements is a counterpart of the other. Another object is to provide, in this form of shaft-coupling, abundant clear space for receiving lubricants; also to provide simple and practical means to prevent the lubricants from leaking or escaping therefrom.

Other objects and important features are pointed out or implied in the following details of description, in connection with the accompanying drawings in which:

Fig. 1 is a longitudinal sectional view taken along the alined axes of the three major elements of the device.

Fig. 2 is a sectional view taken along the line 2—2 of Fig. 1; the spring being omitted.

Fig. 3 is a sectional view similar to Fig. 1, but showing the left-hand axis lower than the right-hand axis, and the axial extensions being parallel with the respective axes, while the combined elements of this coupling are in cooperative relation with one another.

Fig. 4 is a side elevation of a coupling like that of Figs. 1-3, but showing the internal features in dotted lines; the axes of the shaft-connections being angularly related to one another, as in the case of use as a limited universal joint.

Referring to these drawings by use of similar reference-numerals applied to similar parts in the several views, the invention is described in detail as follows:

The outer member or cylindrical hollow casing 5 is integrally formed of any appropriate material; and this is also true of the counterpart coupling units 6 which will hereinafter be distinguished from one another by the words right and left, because of their respective positions in the drawings; and for purpose of facilitating explanation and understanding, we may consider the right-hand member 6 as being the driving member while the left-hand one is the driven member. Each member 6 is formed with a socketed outer end or shaft-connection provided with a set-screw 7 or other appropriate means to secure a shaft-end in the socket 8; and each member 6 is formed with a spheroid or spheroidal head 9 of considerably greater diameter and circumference than those of the cylindrical members 6. Each spheroid 9 is formed with four equally spaced ball-sockets 10 whose axes are in the same plane as that of the major circumference of the spheroid and is at right angles to the axis of rotation.

Eight bearing-balls 11 are provided, one for each ball-socket 10, and each of these ball-sockets is of a proper size to receive substantially one-half of one of these balls in a proper relation for permitting the latter to be easily rotated therein while prevented from changing its location with respect to the spheroid that contains it.

The casing 5 is formed with four axially parallel and equally spaced laterally concave grooves 5a of a proper lateral or radial depth to receive substantially one-half of any one of the bearing-balls, and of a proper length to extend to the opposite end-portions of the casing, that is, to an integral part 12 of the left end of the casing, and to a retaining annulus 13 that is preferably in screw-threaded engagement with the end opposite to the retaining part or integral annulus 12. Each of these annuli has a concave inner surface 14 that complementally conforms to the adjoining convex surface 15 in any of the working positions shown in the several views of the drawings. These surfaces 15 are spring-pressed against the respective concave surfaces 14 by spring means, for instance, by a helical compression spring 16 whose opposite ends are seated in retaining cavities 17 in a proper relation to press the convex surfaces 15 of the units 6 against the concave surfaces 14 of the annuli 12 and 13, thus providing snugly closed joints that retain lubricating material within the casing 5 while excluding dust and other detrimental matter from the casing; and the spring-means 16 continually keeps these joints closed regardless of wear that naturally tends to open these joints. If the shafts are so long as to have considerable expansion that tends to open these joints, one or both of the shafts can be feather-keyed or splined or otherwise secured in the respective socketed connecting elements, or sockets 8, so as to have relative longitudinal movement while secured against turning with respect to the units 6.

In Fig. 3, the parallel dot-dash lines a and b indicate the respective axes and axial extensions of the right and left units 6; and while this indicates a vertical displacement of the axial lines, the coupling compensates as well for a horizontal or a laterally inclined displacement; and while the displacement of the axial lines is only about $\frac{1}{16}$ inch as here shown, only mechanical changes are necessary to adapt this coupling to compensate for greater displacements of the axial lines.

In Fig. 4, the set-screws are omitted, but the screw-holes 6a are those in which the set-screws 7 are adapted to be screwed into.

Though I have described this form of my invention quite specifically, I have no intention to limit my patent protection to these specific and precise details, for the invention is susceptible of numerous changes within the scope of the inventive ideas as implied and claimed.

I claim the following as my invention:

1. In a compensating flexible shaft-coupling, the combination of a substantialy cylindrical hollow casing having opposite pairs of parallel grooves formed therein, two coupling units each comprising a spheroid that has opposite pairs of ball-sockets centered in its major circumferential plane which is at right angles to its axis of rotation, said casing having one of said spheroids in each of its end portions in spaced relation to one another, said casing having annular retaining means in its ends to retain said spheroids therein, springy means compressed between said spheroids in a proper relation to continually press the spheroids against said annular retaining means, and balls respectively fitted loosely and rotatively in the respective ball-sockets and having portions projecting into and movable along said grooves of the casing, said coupling units being provided with means for securing them to shafts which are adapted to be cooperatively rotated, whereby said shafts can be cooperatively rotated while either in axial alinement or in axial-angularity or in parallel axial extension when they are operatively connected to said coupling units by the last-said means.

2. In the combination defined by claim 1, said grooves being substantially straight and extending approximately from end to end of said casing.

3. In the combination defined by claim 1, said annular means comprising concave annular inner surfaces, each of said spheroids having a minor-circumferential convex surface spring-pressed in close conformity with said concave annular inner surfaces so as to prevent escape of lubricating material from within the casing and to exclude extrinsic matter from entering the casing.

4. In the combination defined by claim 1, said annular retaining means comprising an abutment that is integrally formed with one end of said casing and has an inner concave surface normally in close conformity with a convex surface of one of said spheroids.

5. In the combination defined by claim 1, said annular retaining means comprising an annular abutment that is integrally formed with one end of said casing, and an abutment that is normally secured removably in engagement with the opposite end of said casing.

6. In the combination defined by claim 1, each of said spheroids having a centrally disposed cavity, said springy means having opposite ends seated in these cavities in a proper relation to spring-press said spheroids against said annular retaining means.

ELMER E. WILMER.